Patented Dec. 5, 1944

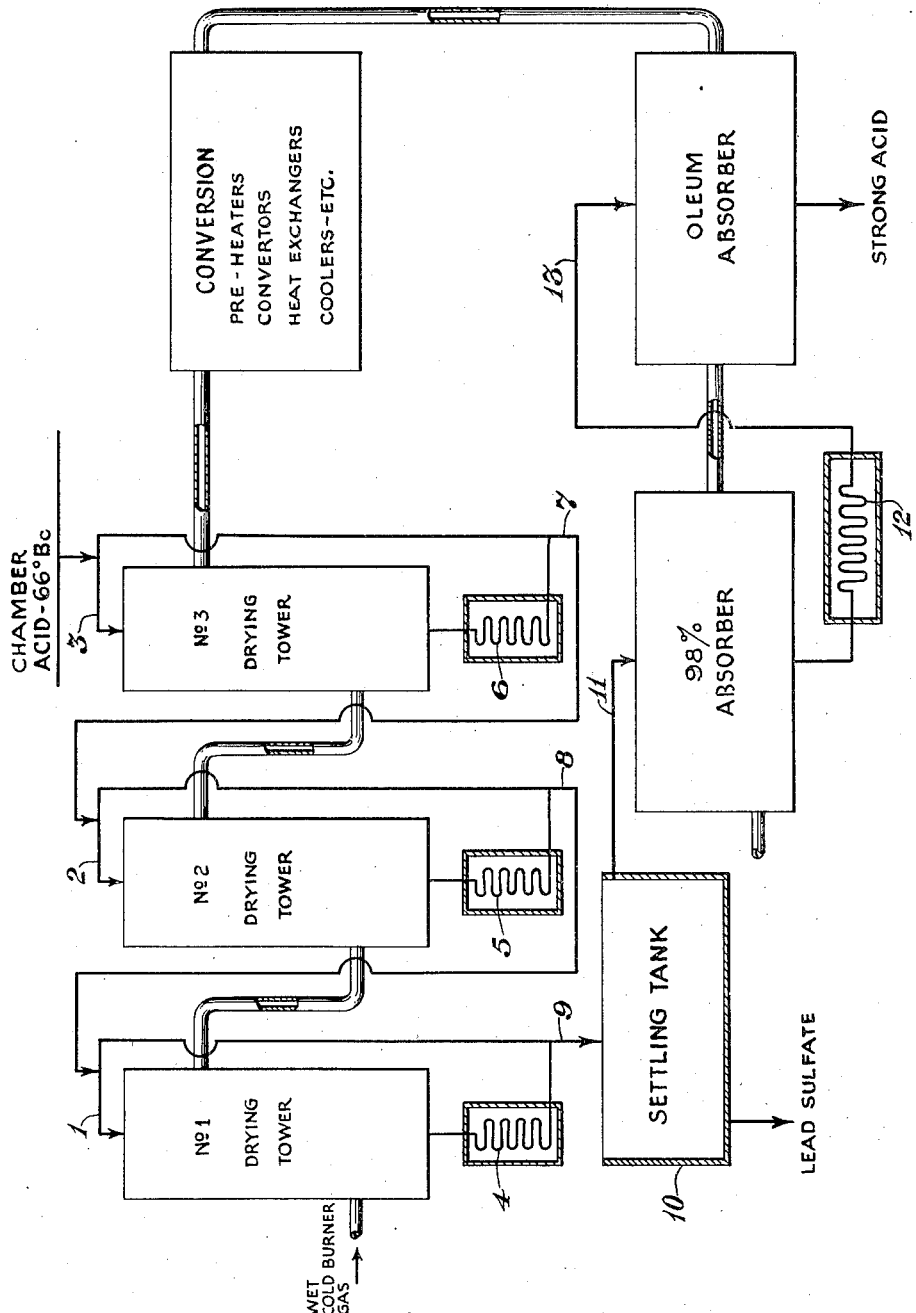

2,364,213

UNITED STATES PATENT OFFICE 2,364,213

MANUFACTURE OF SULPHURIC ACID BY THE CONTACT PROCESS

Carl V. Herrmann, Wilmington, Del., assignor to E. I. du Pont de Nemours & Company, Wilmington, Del., a corporation of Delaware Application March 21, 1942, Serial No. 435,671

4 Claims. (Cl. 23—175)

This invention relates to the production of low-lead strong acids in a contact sulphuric acid plant in which acids containing lead are taken into the plant and fortified to produce strong acids.

It is common practice in the manufacture of sulphuric acid to operate a contact and a chamber plant conjunctively. A contact plant normally is capable of producing excess $SO_3$ over that required to make sulphuric acid from the water necessarily introduced in the process. Accordingly large quantities of $SO_3$ are available for fortifying the weaker chamber acids. It is desirable to fortify such acids for in that manner the production of strong acids, i. e., 98 per cent or stronger, is greatly increased. The general usefulness of such processes, however, is limited in view of the high lead content of acids so produced.

The processes heretofore available for removing lead from chamber acids have not been desirable or economical. It has long been known that lead, in certain ranges of concentration at least, has a solubility proportional to the strength of the acid. Hence, if the chamber acid is diluted, lead sulphate is precipitated and may be separated in settling tanks. The separation of lead, however, in this manner can not be effected without sacrificing the capacity of the plant to produce strong acid of oleum strength because the water introduced to dilute the chamber acid proportionately reduces the capacity of the plant to produce strong acid.

I have now discovered processes by which chamber sulphuric acid and like lead-containing acids can be fortified in a contact sulphuric acid plant without sacrificing capacity to produce strong acid of oleum strength and without excessive contamination by lead compounds, in accordance with which cold moisture-laden gas utilized in the production of $SO_3$ is scrubbed with extra-process lead-containing sulphuric acid of drying acid strength whereby moisture is transferred to and dilutes the extra-process acid, the extra-process acid treated to remove precipitated lead sulphate, and the acid thus obtained utilized in the absorption of the sulphur trioxide produced in the conversion of the dried burner gas.

The invention may be more fully understood by reference to the accompanying flow sheet, which illustrates a typical embodiment of the invention. Wet, cold burner gas obtained from any suitable wet purification system, not shown, is passed through drying towers 1, 2 and 3, thence to any suitable conversion system involving preheaters, converters, heat exchangers, coolers, etc., and thence to an oleum absorber and a 98 per cent absorber.

Drying of the wet, cold burner gas is effected by continuously circulating over each of the three towers an acid of suitable drying strength, as shown in each of the three circulating systems 1, 2 and 3. Each of these circulating systems includes a cooler 4, 5 and 6, in order that the acid, which in passing through the drying tower becomes hot by heat of dilution of the sulphuric acid, may be cooled. The acid circulated over the No. 3 drying tower is maintained at drying acid strength by dripping into the circulating system chamber acid of 66° Baumé strength while the strength of the No. 2 and No. 1 drying tower acids are maintained, respectively, by dripping spent drying tower acid from the succeeding tower. Thus, as drying acid accumulates in the circulating system 3 by dilution the make is withdrawn through line 7 and dripped into the circulating system 2 where the drying tower acid is maintained at a lower strength because of the greater moisture content of the gas being dried in that tower. Likewise, as the drying tower acid in circulating system 2 increases in quantity by dilution the surplus is drawn off through line 8 and dripped into the circulating system 1 where the drying tower acid is maintained much weaker because of the greater moisture content being dried in that tower. As the drying acid circulating in circulating system 1 increases due to dilution the surplus is drawn off through line 9 into settling tank 10. There the lead sulphate which has precipitated in dilution of the chamber acid settled out and the supernatant relatively lead-free acid is withdrawn through line 10 to the 98 per cent absorber where it is fortified to 98 per cent strength. The 98 per cent acid thus obtained passes through the cooler 11, through line 12 into the oleum absorber where it is fortified to oleum strength. The acid thus obtained is relatively lead free.

The only water introduced into the system outside of that contained in the chamber acid is that abstracted from the wet, cold burner gas in the drying towers Nos. 1, 2 and 3. The process is therefore operated on a minimum of water and of consequence produces a maximum production of strong acid.

The effectiveness of the invention in removal of lead is proportional to the dilution of chamber acid effected in the drying system and this in turn is dependent upon the number of towers employed and the moisture content of the burner gas. In a wet purification process the burner gas is essentially saturated with moisture so that variation from this source is mainly a function of temperature which in turn varies with the season of the year.

In a drying system of three towers, as shown, under favorable conditions it is practical to effect dilution from 66° Baumé (93%) to about 48° Baumé (59.3%), for in such a system it is economically practical to circulate acid over the No. 1 drying tower at a strength of 49° Baumé (60.8%) and acid over the second drying tower of 62° Baumé (81.3%), and over the No. 3 drying tower in acid of 65.5° Baumé (90.6%), and obtain a proper distribution of the drying load among the three towers. If only two towers are employed a greater burden is imposed upon each, and of consequence the extent of dilution can not be so great. However, by using two, three, four or more towers any degree of dilution desired is possible.

The principal object of the invention, namely, the reduction of lead content in the strong acids, is accomplished in some measure by any degree of dilution, but for most purposes for which lead-free strong acid is in demand it is desirable to effect a dilution to about 46 to 58° Baumé (56.5 to 74.4%) and this is most conveniently effected in a three-tower system as illustrated.

While I have illustrated my invention with reference to the fortification of chamber acid of 66° Baumé it will be understood that with slight modification it may be practiced in the concentration of extra-process lead-containing acids of other strengths, for example, chamber acid of 60° Baumé. These two strength acids are the common strengths produced in lead chamber systems, the 66° Baumé being the highest concentration practically obtainable in systems having a high heat content and heat economy. It will be understood also that the particular drying system may be varied. Thus, in case of a lower strength acid which may not be strong enough effectively to dry the gas, it will be necessary to effect the final drying step with in-process acid taken from the 98% absorber or from the oleum absorber. It would be sufficient, for example, to drip 60° Baumé acid into the circulating system 2 of the No. 2 drying tower and to drip 98 per cent acid in the circulating system 3 of the No. 3 drying tower. The spent drying tower acid of the No. 3 drying tower would then be returned to the 98 per cent absorber in accordance with the principles and practices commonly known in the art. Also, with slight variation the lead-containing acid may be dripped into any or all of the circulating circuits.

In a contact system devoted essentially to the production of strong acid of oleum strength, the 98 per cent absorber may be operated chiefly as a clean-up absorber, in which case it might be desirable to feed all or a portion of the purified chamber acid directly to the oleum absorber, or oleum absorbers if more than one is employed. Also, should the moisture in the gas be insufficient to provide the water necessary for operating the 98 per cent absorber the deficiency may be made up by dripping water or lead-free acid from any suitable source.

It will also be understood that the invention in its broader aspects is applicable to the so-called abbreviated contact systems in which wet purification is not employed but in which the air utilized in burning sulphur is pre-dried. The amount of dilution which can be effected in such a process, however, is limited in view of the relatively low moisture content of the air being dried. The invention while thus applicable to other systems is most useful in connection with the wet purification system where almost any degree of dilution desired may be effected and where a practical degree of dilution such as will produce an acid sufficiently free of lead for practical purposes can be obtained without increasing the equipment or cost.

Within the scope of the appended claims these and other variations may be made without departing from the spirit of the invention.

I claim:

1. In the manufacture of sulphuric acid by the contact process in which moisture laden gas utilized in the production of the sulphur trioxide is dried, the steps of drying said gas by contact with extra-process lead-containing sulphuric acid of drying strength, said drying effecting sufficient dilution to cause precipitation of lead sulphate, producing sulphur trioxide from said gas, separating precipitates from the spent drying acid and absorbing sulphur trioxide in the acid thus obtained from the spent drying acid.

2. In the manufacture of sulphuric acid by the contact process in which cold moisture saturated burner gas is dried prior to conversion to sulphur trioxide and absorption, the steps of drying said burner gas with extra-process lead-containing sulphuric acid of drying strength whereby moisture is transferred to and dilutes the extra-process acid and converting the dried burner gas to sulphur trioxide, treating the thus diluted extra-process acid to separate precipitates and then fortifying it by absorbing sulphur trioxide from the conversion gases.

3. In the manufacture of sulphuric acid by the contact process the steps of subjecting burner gas to wet purification, drying the cold, wet burner gas in a plurality of drying towers over which there is dripped sulphuric acid of drying strength obtained from a lead chamber process and producing sulphur trioxide from the dried burner gas, withdrawing the spent drying acid into a settling tank and permitting precipitated lead sulphate to separate out, withdrawing the supernatant acid and fortifying it by absorption of sulphur trioxide produced in the process.

4. In the manufacture of sulphuric acid by the contact process in which moisture laden gas utilized in the production of the sulphur trioxide is dried, the steps of drying said gas by contact with extra-process lead-containing sulphuric acid of drying strength, said drying effecting sufficient dilution to cause precipitation of lead sulphate, producing sulphur trioxide from said gas, withdrawing the spent drying acid into a settling tank and permitting precipitated lead sulphate to separate out, separating the precipitate from the spent drying acid and absorbing sulphur trioxide in the acid thus obtained from the spent drying acid.

CARL V. HERRMANN.